United States Patent
Agarwal et al.

(10) Patent No.: US 7,080,081 B2
(45) Date of Patent: Jul. 18, 2006

(54) MULTIDIMENSIONAL DATA CLUSTERING SCHEME FOR QUERY PROCESSING AND MAINTENANCE IN RELATIONAL DATABASES

(75) Inventors: Ramesh C. Agarwal, Cupertino, CA (US); Bishwaranjan Bhattacharjee, Yorktown Heights, NY (US); Leslie A. Cranston, Toronto (CA); Matthew A. Huras, Ajax (CA); Tony Wen Hsun Lai, Toronto (CA); Timothy R. Malkemus, Round Rock, TX (US); Sriram K. Padmanabhan, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 10/122,502

(22) Filed: Apr. 15, 2002

(65) Prior Publication Data

US 2003/0195898 A1 Oct. 16, 2003

(51) Int. Cl.
*G06F 7/00* (2006.01)
(52) U.S. Cl. ...................... 707/100; 707/103
(58) Field of Classification Search ............... 707/3, 707/101, 103, 100
See application file for complete search history.

(56) References Cited

U.S. PATENT DOCUMENTS

| 5,041,972 | A |   | 8/1991  | Frost          | 364/401 |
| 5,325,445 | A |   | 6/1994  | Herbert        | 382/38  |
| 5,864,857 | A | * | 1/1999  | Ohata et al.   | 707/100 |
| 5,884,304 | A | * | 3/1999  | Davis et al.   | 707/4   |
| 5,905,985 | A | * | 5/1999  | Malloy et al.  | 707/100 |
| 5,943,677 | A | * | 8/1999  | Hicks          | 707/205 |
| 6,115,704 | A | * | 9/2000  | Olson et al.   | 707/3   |
| 6,122,628 | A |   | 9/2000  | Castelli et al.| 707/5   |
| 6,496,819 | B1| * | 12/2002 | Bello et al.   | 707/3   |
| 6,542,904 | B1| * | 4/2003  | Crus et al.    | 707/200 |
| 6,694,322 | B1| * | 2/2004  | Warren et al.  | 707/101 |
| 6,718,338 | B1| * | 4/2004  | Vishnubhotla   | 707/102 |
| 6,725,334 | B1| * | 4/2004  | Barroso et al. | 711/122 |

OTHER PUBLICATIONS

ISBN: 0471153370 John Wiley & Sons, 1996, The Data Warehouse Toolkit: Pratical Techniques for Building Dimensional Data Warehouses by Ralph Kimball.*

"The Data Warehouse Toolkit, Practical Techniques for Building Dimensional Data Warehouses" by Ralph Kimball, p. 110.*

Ralph Kimball, The Data warehouse Toolkit/Practical Techniques for Building Dimensional Data Warehouses, John Wiley & Sons, Inc. 1996, p. 110.*

* cited by examiner

*Primary Examiner*—Don Wong
*Assistant Examiner*—Thanh-Ha Dang
(74) *Attorney, Agent, or Firm*—F. Chau & Associates, LLC

(57) ABSTRACT

Multidimensional clustered tables are provided for efficient processing and management in a relational database management system. A multidimensional clustered table is one whose data is simultaneously clustered along one or more independent dimensions, or clustering keys, and physically organized into blocks or pages on disk. When such a table is created, one can specify one or more keys as dimensions along which to cluster the table's data. Each of the dimensions can consist of one or more columns. Further provided are efficient query processing and maintenance techniques for use in conjunction with multidimensional clustered tables.

42 Claims, 9 Drawing Sheets

Block Map

X = Reserved
U = In Use
F = Free
C = Check Constraint
T = Refresh Table
L = Newly Loaded

FIG. 3

|  | AB | BC | ON | QB |
|---|---|---|---|---|
| 9901 | 1, 6, 12 |  | 9, 19, 39, 41, 42 | 11 |
| 9902 | 5, 7, 8, 14, 32 | 2, 15, 17, 31, 33, 43 | 18 |  |
| 9903 | 3, 10 | 4 | 16, 22, 30, 36 | 20, 26 |
| 9904 | 13 | 34, 38, 44, 50 | 24, 25 | 45, 51, 53, 54, 56 |

□ = block

FIG. 5

Composite Dimension Index on YearAndMonth, Province

9901,AB: 1, 6, 12
9901,ON: 9, 19, 39, 41, 42
9901,QB: 11
9902,AB: 5, 7, 8, 14, 32
9902,BC: 2, 15, 17, 31, 33, 43
9902,ON: 18
9903,AB: 3, 10

MULTIDIMENSIONAL DATA CLUSTERING SCHEME FOR QUERY PROCESSING AND MAINTENANCE IN RELATIONAL DATABASES

FIELD OF THE INVENTION

The present invention relates generally to database systems and, more particularly, to techniques for providing multidimensional disk clustering in relational databases and for efficient access and maintenance of information stored in relational databases using multidimensional disk clustering.

BACKGROUND OF THE INVENTION

Almost all businesses are interested in deploying data warehouses to obtain business intelligence in order to improve profitability. It is widely recognized in the technical world that most data warehouses are organized in multidimensional fashion. The text by Ralph Kimball, et al., *The Data Warehouse Toolkit: Practical Techniques for Building Dimensional Data Warehouses*, John Wiley & Sons, ISBN: 0471153370, 1996, describes the use of multidimensional schema to model data warehouses.

A multidimensional array layout has been used by many online analytical processing (OLAP) systems for organizing relatively small data warehouses. However, this multidimensional array structure does not scale well for large data warehouses such as those that require more than 100 gigabytes of storage. Such large data warehouses are still implemented using the relational database model. While conventional relational databases provide some clustering and data partitioning, these techniques are not adequate for supporting multidimensional data.

OLAP systems tend to organize data using many or all dimensions. For efficiency reasons, the conceptual multidimensional array is actually implemented by a multilevel structure. The dimensions are separated into dense and sparse sets based on the expected number of entries for each dimension value. The dense dimensions are implemented as a multidimensional array and the sparse dimensions are used to point to each sub-array. U.S. Pat. No. 5,359,724 by Earle describes such a technique. This arrangement is still inefficient because the dense dimensions are only partially utilized. For instance, in real-world data, it has been reported that dense arrays are usually only about 20% occupied.

Spatial databases and geographic information systems use a two- or three-dimensional data model. Many data structures and methods have been proposed for organizing and indexing spatial data, e.g., R-Trees, QuadTrees, and Grid Files. Some of these indexing structures have been implemented as extensions of an relational database management system (RDBMS) but have not considered the full requirement for maintenance and query processing required in data warehouses or other such implementations. Additionally, the techniques for efficiently clustering the two- or three-dimensional data have not been considered in these systems.

SUMMARY OF THE INVENTION

An efficient space management technique is disclosed for maintaining clustering of tables along one or more dimensions in a relational database management system. Further provided are efficient query processing and maintenance techniques for use in conjunction with these tables.

According to an aspect of the invention, there is provided a method for efficiently maintaining clustered data in a relational database. The method includes the step of identifying dimensions for a table in the relational database using a table definition parameter. The table is clustered along each dimension using blocks of data. A block index is created for each dimension of the table. According to another aspect of the invention, the blocks store information in a contiguous storage space. According to another aspect of the invention, each block index comprises at least one key that is associated with a list of block identifiers. According to another aspect of the invention, the dimensions of the table are associated with one or more columns of the table. According to another aspect of the invention, the table definition parameter is associated with a Create Table or an Alter Table statement. According to another aspect of the invention, the table is a multidimensional table. According to another aspect of the invention, this multidimensional table is used to model typical application information such as for a data warehouse. However, It should be appreciated that the table may be used for various other purposes.

According to yet another aspect of the invention, the method further includes the step of creating a composite dimension index. According to another aspect of the invention, the composite dimension index may be automatically created. According to an aspect of the invention, the composite dimension index includes a list of composite keys, each composite key being associated with a cell of the multidimensional table and having at least one block identifier for the cell.

According to yet another aspect of the invention, the method further includes the step of creating a bit map for the table where each element of the bit map is associated with the current state of a block associated with the table. According to another aspect of the invention, each block contains duplicate state information. According to another aspect of the invention, the bit map is created using the duplicate state information, such as when the original bit map becomes corrupted or otherwise cannot be used.

According to yet another aspect of the invention, the method further includes the step of processing a query for information stored in the table. According to yet another aspect of the invention, processing a query further includes using information from either the individual block indexes or the composite index to obtain a list of block identifiers, and scanning blocks of the table for records. According to another aspect of the invention, processing a query includes the steps of scanning the entire table for records and using a record-based index to find records. According to another aspect of the invention, the method further includes the step of index ANDing. According to another aspect of the invention, the method further includes the step of index ORing. According to another aspect of the invention, the method includes developing a query plan based on a cost model.

According to yet another aspect of the invention, the method further includes the step of processing a maintenance request. According to another aspect of the invention, this maintenance request may include a load, a reorganization of the database, an insertion of records, a deletion of records, a purge, or an update. According to another aspect of the invention, clustering is maintained even after the maintenance operation is performed.

According to yet another aspect of the invention, the load or insert operations involve either using one of the blocks associated with the table or allocating additional blocks (if there is no free space). According to another aspect of the invention, space may be reclaimed if the maintenance operation is a reorganization, a delete, or a purge.

These and other aspects, features and advantages of the present invention will become apparent from the following detailed description of preferred embodiments, which is to be read in connection with the accompanying drawings.

BRIEF DESCRIPTION OF THE DRAWINGS

FIG. 3. is a graphical illustration of an exemplary multi-dimensional table clustered along two dimensions in accordance with an embodiment of the present invention;

FIG. 5. is a graphical illustration of an exemplary composite dimension index in accordance with an embodiment of the present invention;

DETAILED DESCRIPTION OF PREFERRED EMBODIMENTS

Figure 1:
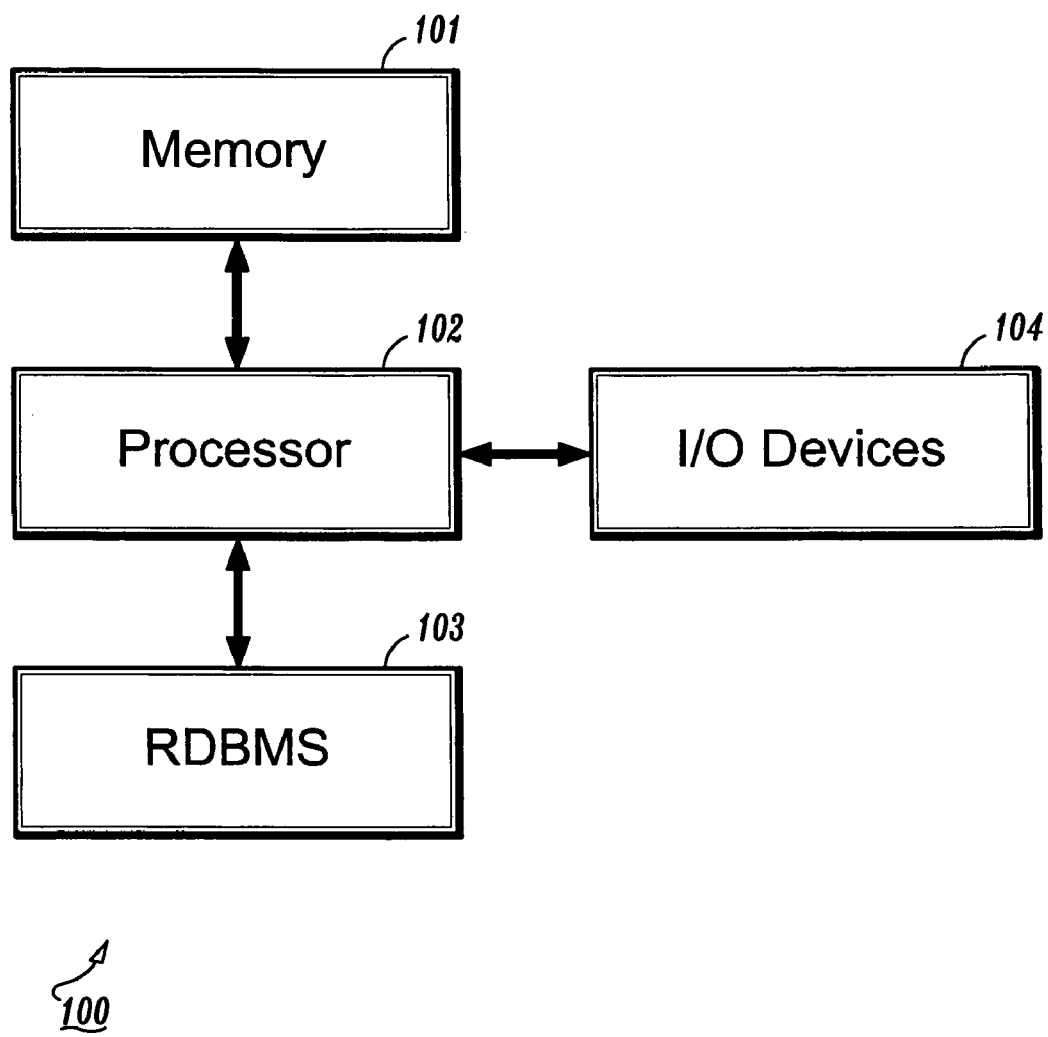
FIG. 1 is a block diagram of an exemplary environment for use with the methodologies of the invention.

First, an environment for multidimensional disk clustering using a relational database management system (RDBMS) in accordance with the invention is described in the context of FIG. 1. The system 100 includes a processor 102 coupled to a memory 101, one or more input/output (I/O) devices 104, and an RDBMS 103. It is to be appreciated that the processor 102 can implement the methods of the present invention. Alternatively, the RDBMS 103 may have its own processor, memory, and I/O device configuration (not shown) to implement the methods of the present invention. In this arrangement, the RDBMS 103 can be hosted on a server platform, for example, and the processor 102, the memory 101, and the I/O devices 104 can be associated with the processor 102 in a client system. Of course, one skilled in the art would readily appreciate that there are many other configurations that may be adopted to process queries using the RDBMS 103 without departing from the spirit and scope of the present invention.

Figure 2:
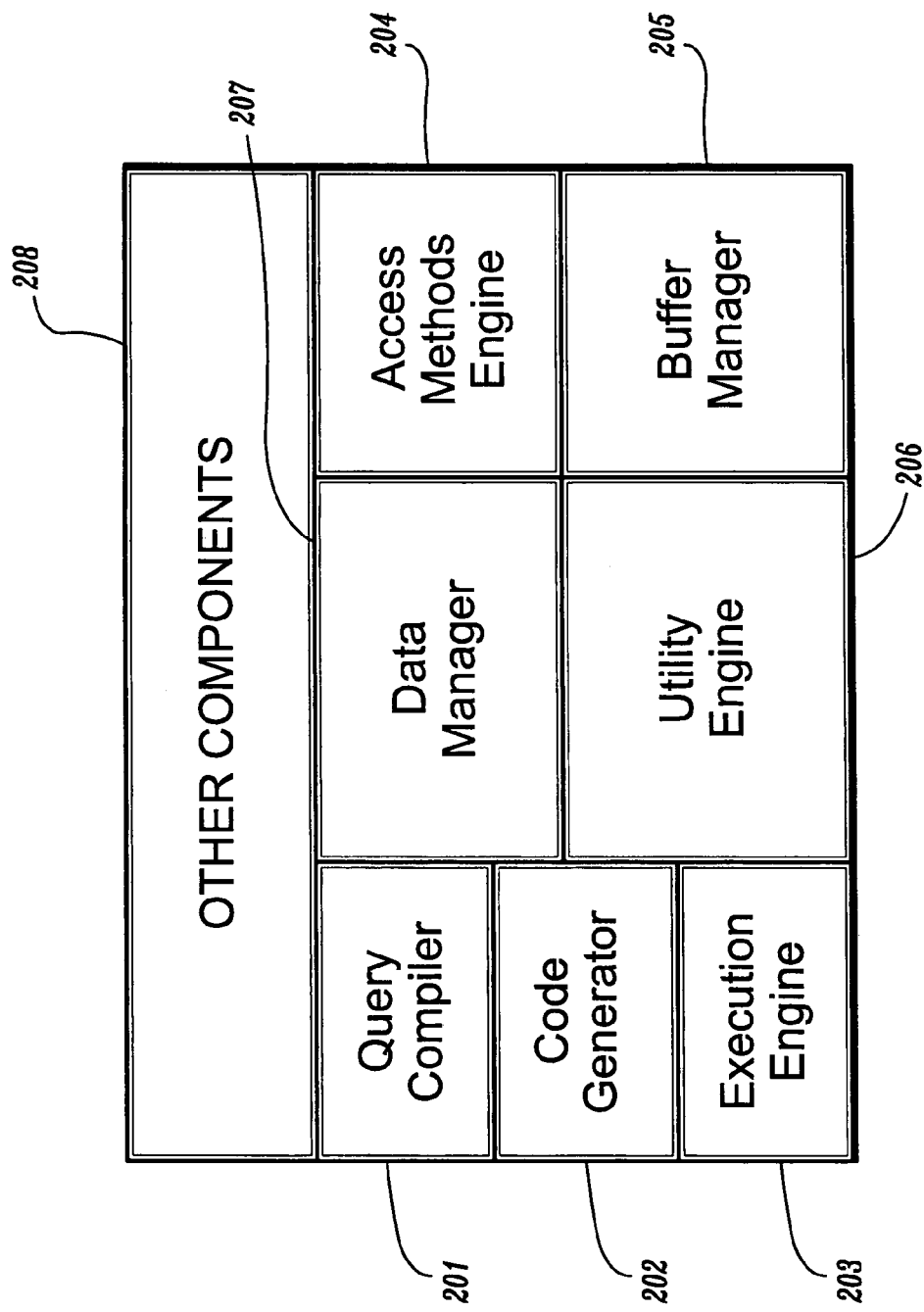
FIG. 2 is a graphical illustration of the exemplary relational database management system of FIG. 1 in accordance with an embodiment of the present invention.

The memory 101 may be used by the processor 102 in performing, for example, storage of information used by the processor 102. The I/O devices 104 may include a keyboard, a mouse, and/or any other data input device which permits a user to enter queries and/or other data to the system 100. The I/O devices 104 may also include a display, a printer, and/or any other data output device which permits a user to observe results associated with queries and/or other processor operations. The RDBMS 103 may contain system software (such as depicted in FIG. 2) to process structured query language (SQL) commands (or other types of queries), including optimizing the SQL commands (or other types of queries) and executing them to obtain information passed back to the processor 102. It is to be understood that the structured data associated with the RDBMS 103 is organized in individual tables, where each table may have a multitude of rows and columns. In a common configuration, an end user using an I/O device 104, such as a standard computer keyboard and/or pointing device, may enter a particular SQL command (or cause the command to be generated). The processor 102 may then receive this command from the I/O device 104, and send it to the RDBMS 103. The RDBMS 103 may then parse the SQL command, optimize the parsed result, and execute it against information associated with the RDBMS. The RDBMS 103 may send a result table back to the processor 102, and the processor 102 may then cause the result table to be displayed to the end user associated with the I/O device 104. It should be appreciated, however, that there are many other ways of interacting with the RDBMS 103. For instance, a computer program running in batch mode may interact with the RDBMS 103 without direct user interaction.

It is to be appreciated that the term "processor" as used herein is intended to include any processing device, such as, for example, one that includes a CPU (central processing unit). The term "memory" as used herein is intended to include memory associated with a processor or CPU, such as, for example, RAM, ROM, a fixed memory device (e.g., hard drive), a removable memory device (e.g., diskette), etc. In addition, the term "input/output devices" or "I/O devices" as used herein is intended to include, for example, one or more input devices, e.g., a keyboard, for making queries and/or inputting data to the processing unit, and/or one or more output devices, e.g., CRT display and/or printer, for presenting query results and/or other results associated with the processing unit. It is also to be understood that various elements associated with a processor may be shared by other processors. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Those skilled in the art will recognize that the exemplary environment illustrated in FIG. 1 is not intended to limit the present invention. Those skilled in the art will appreciate that other alternative environments may be used without departing from the spirit and scope of the present invention.

FIG. 2 illustrates the exemplary RDBMS 103. The RDBMS 103 has a query compiler 201, a code generator 202, an execution engine 203, an access methods engine 204, a buffer manager 205, a utility engine 206, a data manager 207, and other components 208.

In preferred embodiments of the present invention, the RDBMS 103 includes the DB2 product offered by International Business Machines Corporation for UNIX, WINDOWS NT, and other systems. It should be appreciated, however, that the present invention has application to any relational database software, whether associated with the DB2 product or otherwise.

In operation, the RDBMS 103 executes on a computer system and may communicate with one or more clients using a network interface, for example. It can also operate in a standalone server mode receiving instructions from a user via commands. Typically, the client/user issues SQL commands that are processed by the RDBMS 103 and results are returned. During operation, the query compiler 201 parses the input SQL commands and uses the code generator 202 to generate an execution plan. The parsed SQL commands are typically transformed into an internal representation and are then optimized. Optimization involves looking at several alternative strategies for obtaining the correct result, and choosing the most efficient strategy. The execution engine 203 interprets and executes the plan and produces the desired results. The execution engine 203 submits requests to the data manager 207 to obtain information from tables. This is done in the manner that was determined by the query compiler 201 (or separate optimizer), using available indexes, scanning tables, etc. The execution engine 203 uses the access methods engine 204 to efficiently access the underlying database tables that are stored in the access methods engine 204 (or externally thereto). The relevant data items are then retrieved and stored in the buffer manager 205 for reusability of the data. Typically, relational database management systems provide sequential table scan access as well as index-based access to tables. The B-Tree index is the most preferred index technique in RDBMS systems. Optionally, some RDBMS systems allow that the underlying data be clustered and/or partitioned using one or more columns (or index).

In accordance with the present invention, the multidimensional clustering technique described herein impacts the following major components of the RDBMS 103:

1) Data Manager 207 and Access Methods Engine 204: Several new data layout and record management structures, along with modifications to the B-Tree index technique for accessing the data are provided. Also, new techniques for managing concurrent access and recovery of the data structures are supported.

2) Execution Engine 203: New operators for query processing and database maintenance operations to take advantage of the changes to the Data Manager 207 and the Access Methods Engine 204 are provided.

3) Query Compiler 201 and Code Generator 202: New cost-based techniques for choosing between the new operators and existing operators are provided.

4) Utility Engine 206: New schemes to perform utility operations such as bulk loading and data reorganization are provided.

In general, the RDBMS 103 software, and the instructions derived therefrom, are all tangibly embodied in a computer-readable medium, e.g., a medium that may be read by a computer. The RDBMS software and the instructions derived therefrom, are all comprised of instructions which, when read and executed by a computer system, causes the computer system to perform the necessary steps to implement and/or use the present invention. Under control of an operating system, the RDBMS 103 software and the instructions derived therefrom, may be loaded from an appropriate data storage device and into memory of a computer system for use during actual operations.

FIG. 3. illustrates an exemplary multidimensional table clustered along two dimensions. The multidimensional table shown in FIG. 3 is clustered along dimensions 'YearAndMonth' 300 and 'Province' 310. Records in the table are stored in blocks, which may contain an extent's worth of consecutive pages stored on disk or some other suitable medium. In the diagram, a block is represented by an oval, and is numbered according to the logical order of allocated extents in the table. For example, the oval 301 points to the first block in the table which is block 1. The grid in the diagram represents the logical partitioning of these blocks, and each square, such as square 302, represents a logical cell. A column or row in the grid represents a slice for a particular dimension. For example, all records containing the value 'ON' (for 'Ontario') in the Province 310 column are found in the blocks contained in a slice defined by the 'ON' column in the grid. In fact, each block in this slice only contains records having 'ON' in the province field. Thus, a block is contained in this slice or column of the grid if and only if it contains records having 'ON' in the province field. In the exemplary multidimensional table depicted in FIG. 3, the slice for the 'ON' province column includes blocks 9, 16, 18, 19, 22, 24, 25, 30, 36, 39, 41, and 42.

While blocks are numbered sequentially starting from block 1 in the exemplary table shown herein, it should be appreciated that the blocks could be identified in numerous other ways. For instance, the first block in a table could alternatively be labelled as block 0. One skilled in the art would realize that various other ways to identify portions of information related to a table could be devised and different terminology employed without departing from the spirit and scope of the present invention.

Figure 4:
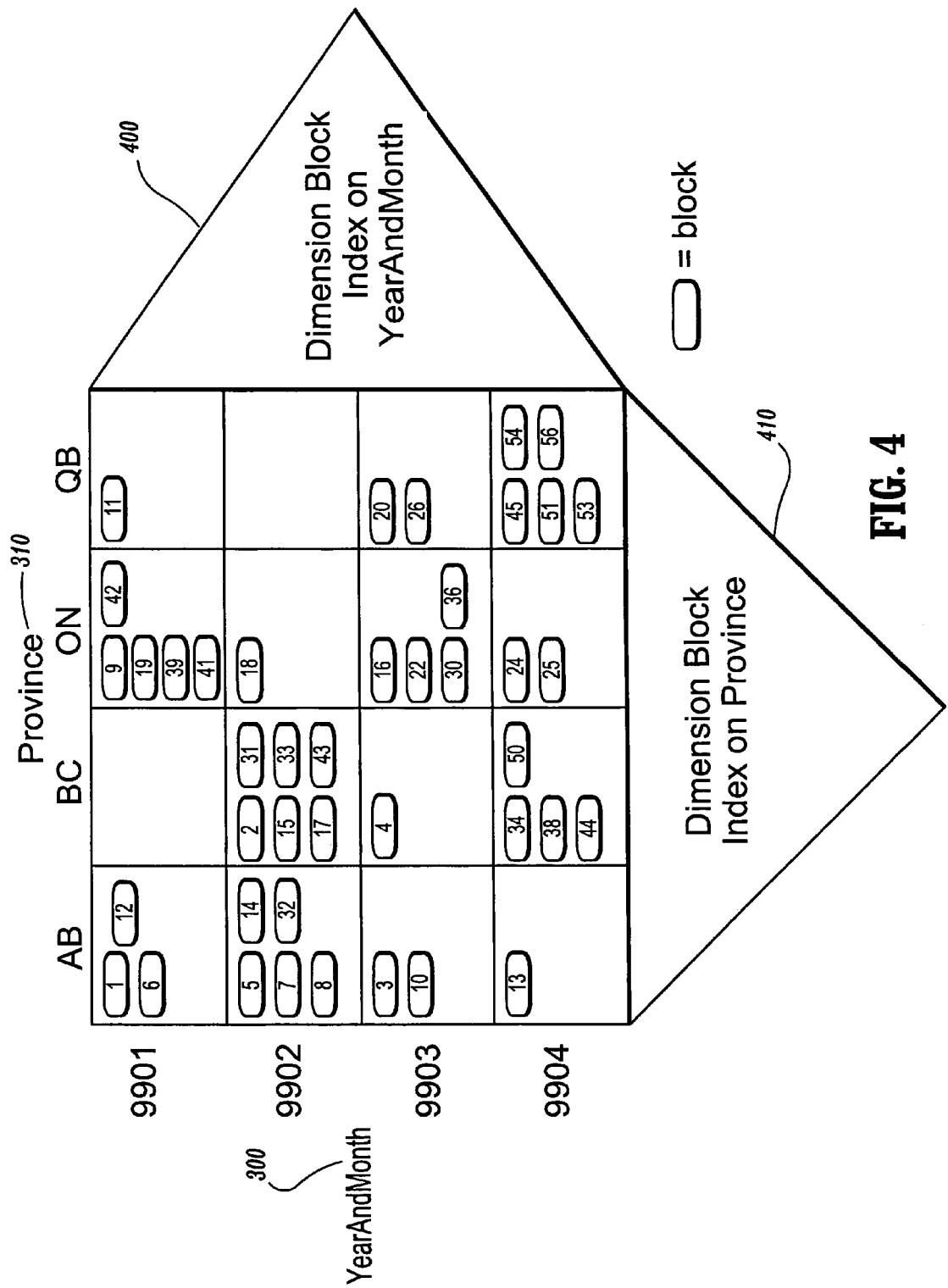
FIG. 4. is a graphical illustration of the exemplary multidimensional table of FIG. 3 with dimensional block indexes on each dimension in accordance with an embodiment of the present invention.

FIG. 4 illustrates the exemplary multidimentional table of FIG. 3 with dimensional block indexes on each dimension. To facilitate the determination of which blocks comprise a slice, or which blocks contain all records having a particular dimension key value, a dimension block index may be automatically created for each dimension when a table is created. Thus, a dimension block index 400 may be created on the YearAndMonth dimension 300, and a dimension block index 410 may be created on the Province dimension 310. Each dimension block index can be structured in the same manner as a traditional record-based index, except that at the leaf level the keys point to a block identifier (BID) instead of a record identifier (RID). Advantageously, since each block contains potentially many pages of records, these block indexes are much smaller than RID indexes and need only be updated as new blocks are required and so added to a cell, or existing blocks are emptied so as to be removed from a cell.

A slice, or the set of blocks containing pages with all records having a particular key value in a dimension, will be represented in the associated dimension block index by a BID list for that key value.

In the exemplary multidimensional table depicted in FIG. 4, to find the slice containing all records with 'ON' for the Province dimension, we would look up this key value in the Province dimension block index, and find a key such as the following:

<ON: 9, 16, 18, 19, 22, 24, 25, 30, 36, 39, 41, 42> where the key is in the form of a <key value: BID(s)>pair.

The key is comprised of a key value, namely 'ON', and a list of BIDs. Each BID contains a block location. We see that, in this example, the block numbers listed are the same as those found in the 'ON' column, or slice, found in the grid for the multidimensional table. Similarly, to find the list of blocks containing all records having '9902' for the YearAndMonth dimension, we would look up this value in the YearAndMonth dimension block index, and find a key such as the following:

<9902: 2, 5, 7, 8, 14, 15, 17, 18, 31, 32, 33, 43>.

The clustering of the table may be specified in the SQL language using an appropriate clause added to the Create Table or Alter Table statements by which the clustering attributes can be specified. For example, the following Create Table statement may be used to create the table in this example.

CREATE TABLE TABLE_1 (Date DATE, Province CHAR(2),
  YearAndMonth INTEGER
  DIMENSIONS (YearAndMonth, Province);

In this case, the dimensions YearAndMonth and Province were defined for table TABLE_1 using the DIMENSIONS clause. The clustering of the table must be enforced on all the data in the table. In particular, if the clustering is specified using the Alter Table command on an existing table, this will require a reorganization of the data to be performed as well. Note that the block indexes can be created for the clustering attributes automatically.

FIG. 5 illustrates a data structure for an exemplary composite dimension index. When a record is inserted into a table, we wish to determine if a cell already exists for its dimension values. If one does, we will insert the record into an existing block of that cell if possible, or add another block to that cell if the current blocks are full. If the cell doesn't yet exist, we will want to create a new cell and add a block to it. This automatic maintenance may be implemented with an additional block index, called a composite dimension index, and can be created when the multidimensional table is created. This composite dimension index will be on all the dimension columns of the table, so that each key value corresponds to a particular cell in the table and its BID list of blocks comprising that cell. This is shown in FIG. 5. This composite block index assists in quickly and efficiently finding those blocks having a particular set of values for their dimensions. It may also be used to dynamically manage and maintain the physical clustering of data along the dimensions of the table during an insert operation. It should be appreciated that multidimensional index structures such as R-trees could also be used to implement a composite dimension index if they were to point to blocks rather than records or objects.

Figure 6:
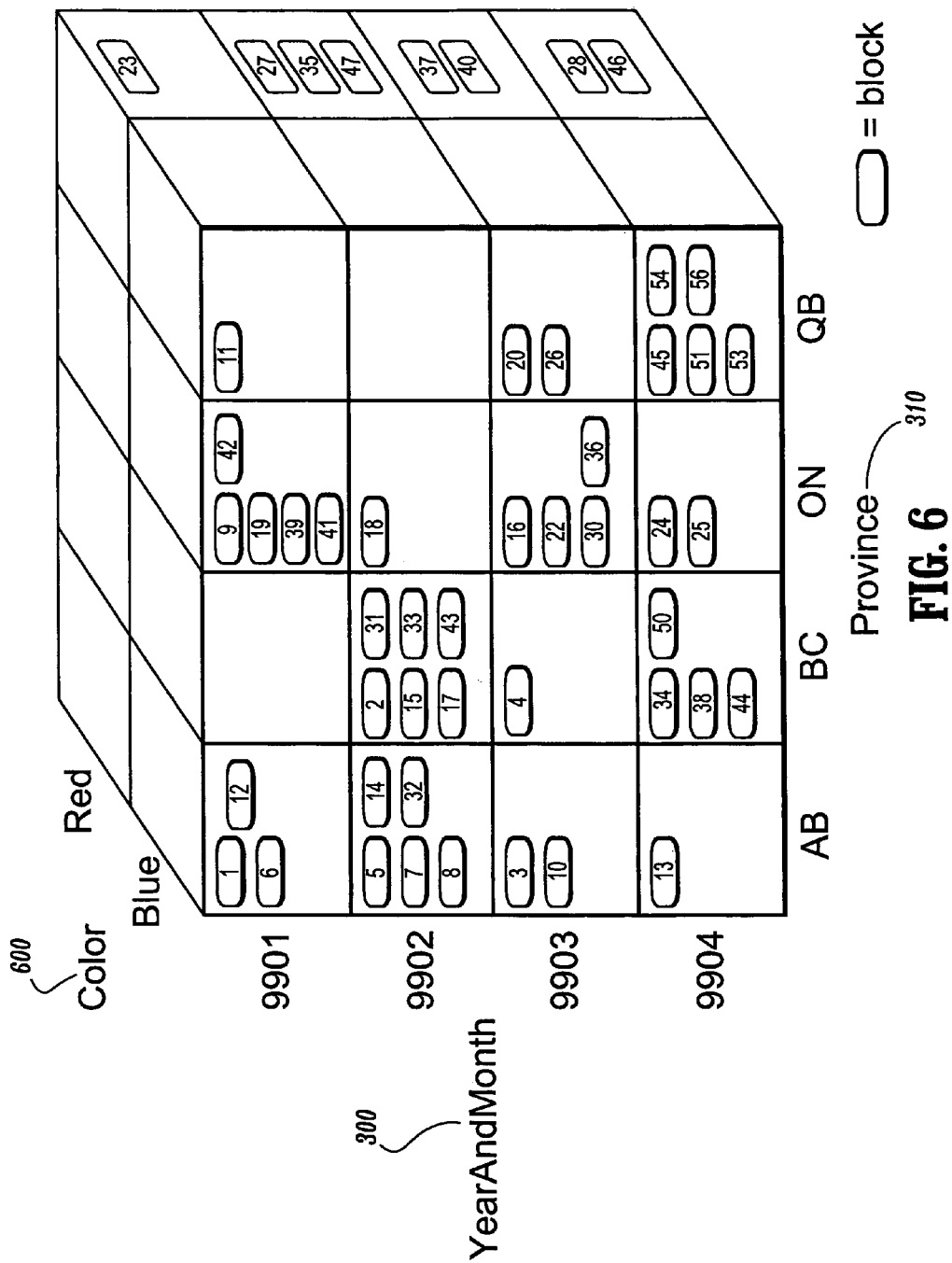
FIG. 6. is a graphical illustration of the exemplary multidimensional table of FIG. 3 extended to a third dimension in accordance with an embodiment of the present invention.

FIG. 6 illustrates an extension of the table of FIG. 4 that includes an additional dimension. If we have a multidimensional table dimensioned on the YearAndMonth dimension 300, the Province dimension 310, and a Color dimension 600, as shown in FIG. 6, for example, this can be thought of as a logical cube. In this example, four block indexes would be created: one for each of the individual dimensions, i.e., the YearAndMonth dimension 300, the Province dimension 310, and the Color dimension 600; and a composite dimension index (not shown) with all of these dimension columns as a key.

One of the goals of the present invention is to facilitate efficient query processing. We now discuss the query processing methods that are facilitated by the present invention. Consider the 3-dimensional cube shown in FIG. 6 which is dimensioned along the YearAndMonth dimension 300, the Province dimension 310, and the Color dimension 600. A query such as the following: "What is the aggregate sales of Color='Red' over all dates and regions?" could be processed in several different ways. The choices for processing this query include:

1) Table Scan: Scan the entire table and only select the rows with Color='Red'.
2) Block Scan: Use the block index on Color to narrow down the search to a specific set of blocks.
3) Record Scan: Use a record-based index on Color (if it exists) to narrow down the search to a specific set of records.

The query optimizer can use a cost model to find the best of these choices. The block scan method is a new operation that is introduced in this invention. This block scan operation proceeds in two steps: (i) scan the block index to find block identifiers that satisfy the query predicate, and (ii) process all the records in the block. This might involve additional predicates. The block scan operation is most effective when most of a block or sets of blocks or records need to be processed for a given query. Such requirements are fairly typical in data warehouses. For example, the above query is very likely to involve access to a whole set of blocks. Thus, the block scan operation is likely to be the most efficient method of processing this query.

It should be noted that RID indexes may also be supported for multidimensional tables, and RID and block indexes can be combined by index ANDing and index ORing techniques. Multidimensional tables are otherwise treated like any existing table. For instance, triggers, referential integrity, views, and automatic summary tables can be defined upon them.

Figure 7A:
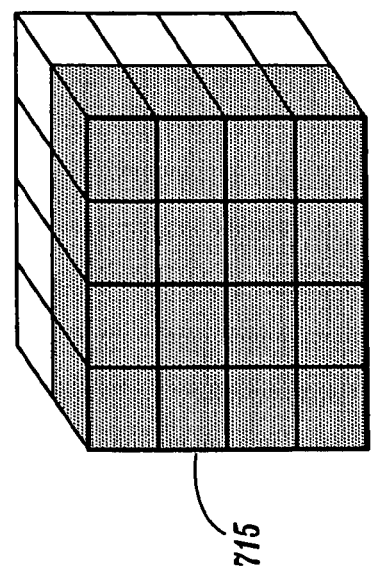
FIGS. 7(a)–(c) are graphical illustrations of an index ANDing technique in accordance with an embodiment of the present invention.
Figure 7B:
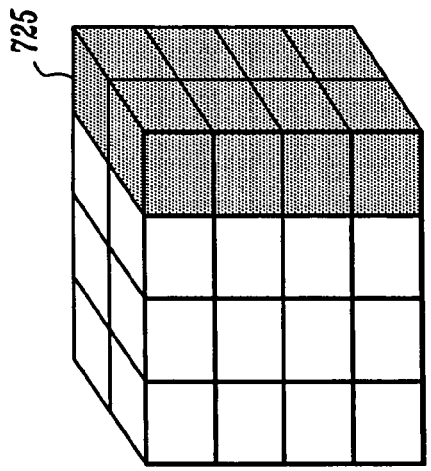
Figure 7C:
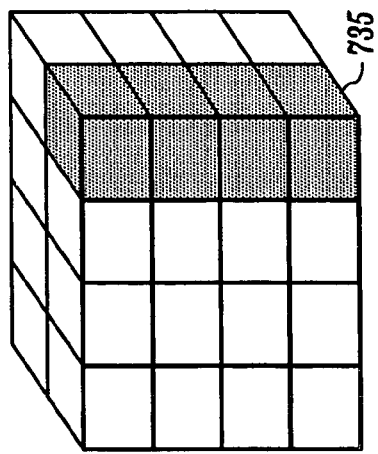

FIG. 7(a)–(c) illustrates how index ANDing may be accomplished using block indexes. Consider a query against the 3-dimensional cube shown in FIG. 6 for Color='Blue' and Province="QB'. We would first determine the slice containing all blocks with Color='Blue', by looking up the 'Blue' key value in the Color dimension block index associated with the table. We would find a key such as <Blue: 1, 2, 3, 4, 5, 6, 7, 8, 9, 10, 11, 12, 13, 14> corresponding to slice 715 shown in the cube diagram of FIG. 7(a) (highlighted in grey).

We would then determine the blocks containing all records having Province='QB', by looking up the 'QB' key in the Province dimension block index, finding a key such as

<QB: 11, 20, 26, 45, 51, 53, 54, 56, 23, 27, 35, 47, 37, 40, 28, 46> corresponding to slice 725 shown in the cube diagram of FIG. 7(b). To find the set of blocks containing all records having both values, we would have to find the intersection of these two slices. This is done by index ANDing the two BID lists. In this example, the common BID values are 11, 20, 26, 45, 51, 53, 54, and 56, and this corresponds to section 735 of the cube diagram shown in FIG. 7(c).

Once we have a list of blocks to scan, we can simply do a mini-relational scan on each block. This would involve just one I/O as a block is stored as an extent on disk and can be read into the bufferpool as a unit. If the query predicates need to be reapplied and some of the predicates are only on dimension values, we need only to reapply these predicates on one record in the block since all records in the block are guaranteed to have the same dimension key values. If other predicates are present, we need only check these on the remaining records in the block.

The block-based index ANDing scheme is very efficient since a bit map scheme can be used. Also, since the block-level indexes are smaller than the RID indexes, the processing time for index ANDing is significantly less. Finally, the intersecting list of blocks are accessed efficiently using block-based I/O operations. Overall, the operation is extremely efficient and should be significantly faster than existing alternatives prior to this technique.

Conventional RID-based indexes are also supported for multidimensional tables, and RID and block indexes can be combined by index ANDing and ORing.

As mentioned, a block-based index ORing operation may also be performed using block indexes. For example, if the query includes the condition Province='ON' or Province='BC', then the province block index can be scanned for each category and an aggregated list of blocks can be obtained by an ORing operation. The ORing operation can eliminate duplicate BIDs which are possible for conditions such as Province='AB' or Color='Red'.

A secondary block index scan can also be supported. Given a secondary block index, a single BID can appear under numerous keys. Note that this is never possible in a RID index. When a secondary block index is used to access a fact table, it is critical that a qualifying block be scanned just once. All records from a qualifying block should be accessed on that scan and the block should not be fetched again. This requires that the qualifying list of blocks be maintained so that duplicates can be eliminated.

Figure 8:
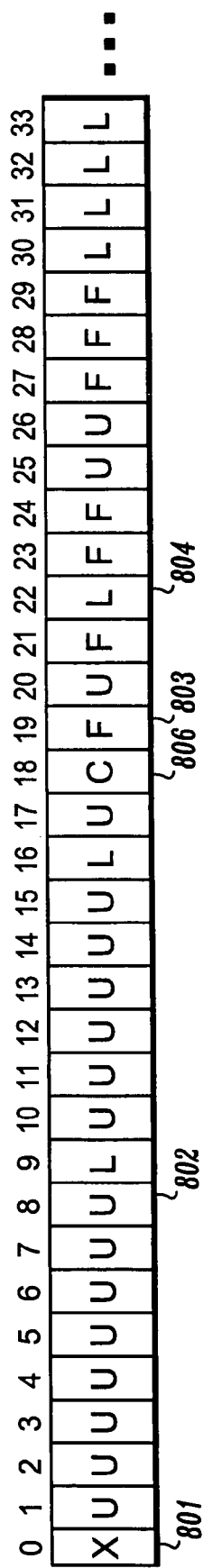
FIG. 8. is a graphical illustration of an exemplary block map in accordance with an embodiment of the present invention.

FIG. 8 illustrates an exemplary block map associated with a multidimensional table. The block map records the current state of each block belonging to a particular table. For example, element 801 in this block map represents block 0 in a multidimensional table. Its availability status is 'X' indicating that it is reserved; it will never be used to store data rows of the table. Element 802 in the block map represents block 8. Its availability status is 'U' indicating that it is in use. Similarly, blocks 1–7, 10–15, 17, 20, 25, and 26 are also in use. This means that records in the table appear in these blocks. Element 803 in the block map represents block 19. Its availability status is 'F' indicating that the block is free. Similarly, blocks 21, 23, 24, and 27–29 are also free. This means that these blocks are not currently being used by the table and are available. Element 804 in the block map represents block 22, and its availability status is 'L' indicating that the block has recently been loaded with information. Similarly, blocks 9, 16, and 30–33 are also recently loaded blocks. Element 806 in the block map represents block 18. Its availability status is 'C'. Block 18 was previously loaded and still needs constraint checking done.

It should be appreciated that the block map shown in FIG. 8 contains various status flags having particular values but that other values could also be used to reflect different or additional block statuses. Furthermore, it should be appreciated that the bit map data structure may be constructed in such a way that additional elements representing additional blocks or other information may be dynamically allocated.

Each block may have a header, located in a first slot of the block's first page which stores a structure containing, among other possible things, a copy of the block status so that the block map can be re-created if necessary in case of deletion or corruption of the map, and a bit map covering the pages of the block, indicating which pages are empty (e.g., 0=empty, 1=nonempty, even if it contains only overflow or pointer records). Each block may also have a free space control record (FSCR) associated with it that could contain page offsets and approximations of free space per page. These FSCR's may be located on the first page of a block, and stored as the second record on this page, for example.

The above-mentioned organization of a table is very space efficient. It is important to choose the multidimensional keys and a corresponding block size so that each cell will have one or more blocks of data. Only the last block is likely to be partially full. This highly efficient state can be maintained even in the presence of frequent insert and delete operations or background reorganization. In contrast, OLAP organizations will lead to quite a bit of unused space as has been discussed previously.

Figure 9:
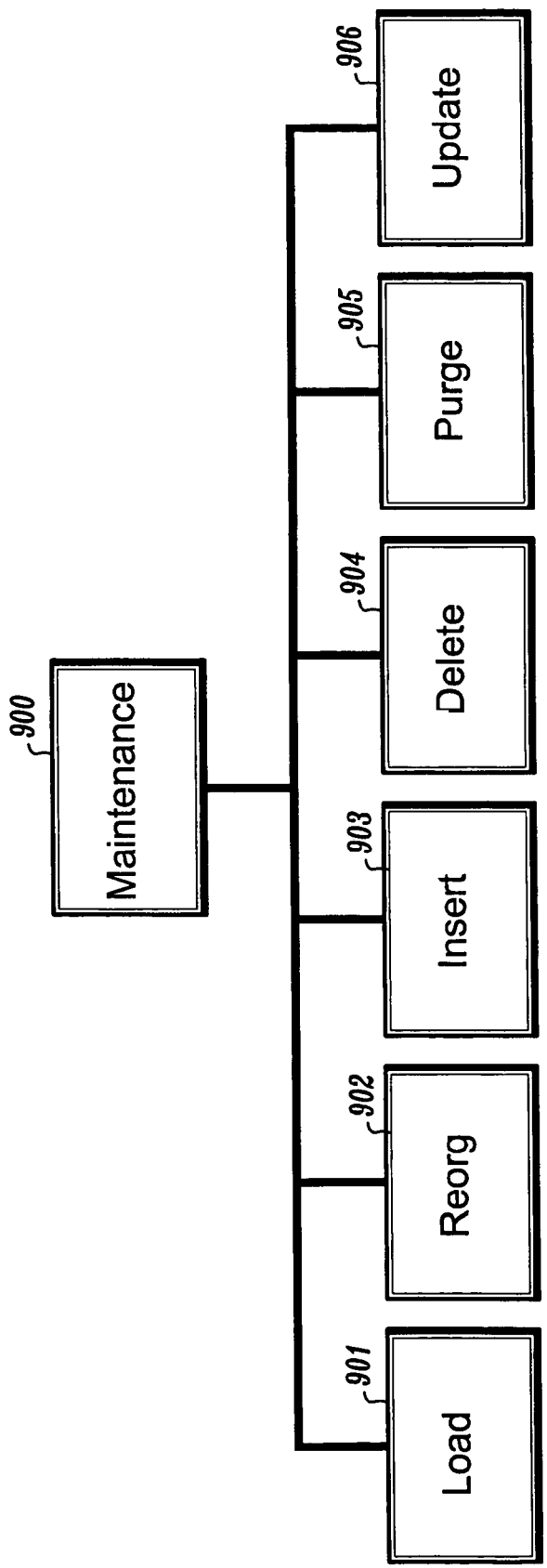
FIG. 9 is a graphical illustration of various exemplary maintenance functions in accordance with an embodiment of the present invention.

FIG. 9 illustrates various maintenance functions that can be performed in accordance with the techniques of the present invention. FIG. 9 includes a maintenance function 900 which includes a load function 901, a reorganization ("reorg") function 902, an insert function 903, a delete function 904, a purge function 905, and an update function 906. These will now be described in detail.

Load Function 901

A load is typically used to load relatively large amounts of data into a table rather than issuing numerous insert commands. The load utility can access a data set formatted in a particular manner, and use the information in the data set to create rows in a particular table.

It is important that the load utility employ an efficient scheme to insert data into a table. Loading data into a multidimensional table may be advantageously accomplished by organizing the input along dimension values. (This may be established as the default for multidimensional tables). This is necessary in order to ensure that records are clustered appropriately along dimension values and block boundaries. For example, a bin can be created for the logical cell corresponding to <YearAndMonth=9903, Province='ON', Color='Red'>. All records with similar values of the dimension attributes can be assigned to this bin. Physically, each bin can be represented by a block of data pages. Recently processed bins can be maintained in memory and written to disk when they become full or if there is a need to bring other bins into memory.

One method to reduce processing is to allow users to specify a clause in their LOAD command, such as, for example, a MODIFY BY ASSERTORDER clause. This optional clause (or one similar to it having the same effect) can be used to inform the load utility that the input data set is already in sorted order and hence the processing can be done more efficiently. This is useful in several instances, including, for example when the data is already sorted on dimension and key value, allowing the load utility to merely verify the order. As another example, it is useful when loading records for a particular cell and thus all dimension values are the same for the records added. This may be the case, for instance, when a table has a single dimension and the user is rolling in records having a particular value for that dimension (e.g., all records from February, 2001). If the MODIFY BY ASSERTORDER clause (or one similar to it having the same effect) is specified, the load utility can be configured to verify that the data is properly ordered. In the event that the load utility encounters a record out of sequence, the load can cease processing, leaving the table in a load pending state, for example.

Reorganization Function 902

Reorganization utilities are used to rearrange the physical layout of the data in a database. Reorganization (or "reorg") of a database may be needed to release fragmented data space or to rearrange (cluster) records having a cluster index.

Reorganization of a multidimensional table is much simpler and is required less often than for a table with a clustering index. Since clustering can be automatically and continuously maintained in multidimensional tables, reorganization would no longer be required to recluster data. The reorganization utility can still be used, however, to reclaim space in a table (specifically, to reclaim space within cells) and to clean up overflow records. The reorganization utility for a multidimensional table is block-oriented. The composite dimension block index can be used to access records of particular blocks. The records can be rearranged into a new block using reorganization parameters such as, for example, an amount of free space needed. It is possible that the initial logical cell might contain many blocks while the rearranged cell might contain fewer blocks. For example, initially, a cell might contain blocks 1, 10, 30, and 45. After reorganization, the cell might contain only new blocks 1 and 2. The rest of the space would have been released for use by other cells or completely freed up from this table. A new block map may also be reconstructed at the end of the reorganization.

Insert Function 903

Inserting involves creating new records in a table. Clustering must be maintained during an insert operation. Suppose we wish to insert a record with dimension values <9903, 'AB'> into a multidimensional table (such as the one depicted in FIG. 4). We would first need to identify the appropriate block for this new record by using a composite block index. We would look up the key value 9903, AB in the composite block index (such as is depicted in FIG. 5), and find a key such as:

<9903, AB: 3, 10>

In this case, we find that there are two blocks 3 and 10 with this key value. These blocks contain all the records—and only those—that have the dimensions specified. We, therefore, insert the new record in one of these blocks if there is space on any of their pages. If there is no space on any pages in these blocks, we either allocate a new block to the table or use a previously emptied block in the table. A block map (such as is depicted in FIG. 8) can be searched to find a free block. Let's say that after consulting the bit map for the table, it was determined that block 48 is currently not in use by the table (e.g., its status is 'F' indicating it is free). In this case, we would insert the record on a page of block 48, and assign this block to the cell by adding its BID to the composite block index and to each of the dimension block index. The resulting keys in the dimension block indexes would be <9903: 3, 4, 10, 16, 20, 22, 26, 30, 36, 48>
<AB: 1, 3, 5, 6, 7, 8, 10, 12, 14, 32, 48> and the resulting keys in the composite block index would be

<9903, AB: 3, 10, 48>.

Suppose there were no more free blocks in the table. Then, a new block would be allocated for the table, and used to insert the row. The indexes would be updated as shown above in that case as well.

If a record with new dimension values is inserted, then a new block or free block must be allocated. The new key values would be added to the dimension and composite block indexes.

When performing the insert function, we have to pay special attention to the insert of the first record in a block as well as the first record to a new page in a block. We can use a page bit map for each block to maintain the state of the pages in the block. A bit in the page bit map can be set when the first record is inserted into the page. This bit map enables us to track the occupancy of pages in a block and helps to maintain the state of the block in the presence of inserts and delete operations.

Delete Function 904

Technically, a delete operation deletes one or more records in a table and frees up the space occupied by these records. Deletion of a multidimensional table also does the same thing. However, special attention is given to the state of pages in a block and the entire block as well. If we delete the last record of a page, then the page bit map is updated to clear the bit associated with the particular page. When all pages in a block are empty, this page bit map is fully cleared and this will indicate that the block can be marked free in the block map. This free block can be reused by future insert and load operations, for example. When a block is freed, we must also update all the dimension indexes and remove the BID associated with the freed block from particular key(s) corresponding to the dimension attributes for the block.

Purge Function 905

Purge is a special form of the delete operation when a large set of related records are deleted. Consider the following SQL statement:

Delete from Table_1 where color='Red';

Assume that the color attribute is a dimension of this table (such as is the case for the table depicted in FIG. 6). Hence, the constraint color 'Red' indicates that all blocks associated with the 'Red' value are to be deleted. We could accomplish this by looking up the dimension block index of color for 'Red' and finding a list of associated BIDs. Suppose this list was 12, 17, 21, and 30. If there were no other indexes or related data structures on this table, we could mark these blocks as free in the block map for the table and delete the BIDs from the block indexes. This would be an extremely fast operation and would reduce the logging and index maintenance costs as well.

It is possible to detect that a purge style of delete is applicable by examining the delete statement and verifying that the constraint is based on one or more dimension clauses. In particular, if one or more block indexes are used to identify the set of BIDs that need to be processed, we can consider using the purge style of delete. The optimizer can detect this and generate a suitable query plan accordingly. Note that the optimizer will also have knowledge of the additional issues that may enable or disable a fast purge. These issues include presence of additional indexes and constraints on the table.

Update Function 906

The update operation involves modifying information in a table. In a multidimensional table, the updates are of two kinds:

1) Simple update: In this case, the update applies only to attributes or fields of the table that are not dimensions. Hence, the row continues to belong to the same logical cell. It may reside in the same location if the changes do not require additional space. Otherwise, it could move to a new location in the same block or to another block. When moving this record, we maintain the original location's RID and point to the new location using the overflow pointer technique. If the new location is a new block, we will need to insert the new block in the dimension block indexes.

2) Update of the dimension column(s): If the update is to one or more dimension columns, we will need to treat this as a delete and an insert, internally. This will ensure that the record is now clustered in the new cell since it cannot be located in a block belonging to the old cell. The techniques described above for delete and insert are combined in order to perform this operation.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer executable method for efficiently maintaining clustered data in a relational database, comprising the steps of:

identifying at least one dimension of a table of the relational database using at least one table definition parameter;

clustering data for each of the at least one dimension using at least one block;

creating at least one block index, each of the at least one block index being associated with one of the at least one dimension, wherein each of the at least one block index comprises at least one key that is associated with a list of at least one block identifier, and creating a block map for the table, each element of the block map having state information for one of the at least one block, wherein each of the one or more block contains duplicate state information, and wherein the block map is created using the duplicate state information contained in the one or more block.

2. The method of claim 1, wherein each of the at least one block comprises contiguous storage space.

3. The method of claim 1, wherein each of the at least one dimension is associated with at least one column of the table.

4. The method of claim 1, wherein the at least one table definition parameter is associated with a Create Table or an Alter Table statement.

5. The method of claim 1, wherein the table is a multi-dimensional table.

6. The method of claim 5, wherein the multidimensional table is used to store application information.

7. The method of claim 6, wherein the application information is for a data warehouse.

8. The method of claim 5, further comprising the step of creating a composite dimension index for the multidimensional table.

9. The method of claim 8, wherein the step of creating a composite dimension index is automatically performed.

10. The method of claim 8, wherein the composite dimension index comprises a list of composite keys, each composite key being associated with a cell of the multidimensional table and having a list of at least one block identifier for the cell.

11. The method of claim 1, further including the step of processing a query for information stored in the table.

12. The method of claim 11, wherein the step of processing the query comprises:

using information from one of the at least one block index and the composite dimension index to obtain a list of block identifiers; and scanning at least one block for records that satisfy at least one criterion using the list of block identifiers to locate the at least one block to be scanned.

13. The method of claim 11, wherein the step of processing the query comprises at least one of:

scanning the entire table for records that satisfy at least one criterion; and using a record-based index to find records that satisfy at least one criterion.

14. The method of claim 11, wherein the step of processing the query comprises index ANDing.

15. The method of claim 11, wherein the step of processing the query comprises index ORing.

16. The method of claim 11, wherein the step of processing the query comprises developing a query plan based on a cost model and processing the query according to the query plan.

17. The method of claim 1, further comprising the step of processing a maintenance request.

18. The method of claim 17, wherein the maintenance request comprises a request for one of a load, a reorganization, an insert, a delete, a purge, and an update.

19. The method of claim 18, wherein the step of processing a maintenance request for a load or an insert comprises one of:

using one of the at least one block if there is free space; and allocating a new block to the table if there is no free space.

20. The method of claim 17, wherein clustering of the table is maintained after the maintenance request is processed.

21. The method of claim 17, wherein the step of processing a maintenance request for a reorganization, a delete, or a purge comprises the step of reclaiming space.

22. A program storage device readable by a machine, tangibly embodying a program of instructions executable on the machine to perform method steps for efficiently maintaining clustered data in a relational database, the method steps comprising:

identifying at least one dimension of a table of the relational database using at least one table definition parameter;

clustering data for each of the at least one dimension using at least one block;

creating at least one block index, each of the at least one block index being associated with one of the at least one dimension, wherein each of the at least one block index comprises at least one key that is associated with a list of at least one block identifier; and creating a block map for the table, each element of the block map having state information for one of the at least one block, wherein each of the one or more block contains duplicate state information, and wherein the block map is created using the duplicate state information contained in the one or more block.

23. The program storage device of claim 22, wherein each of the at least one block comprises contiguous storage space.

24. The program storage device of claim 22, wherein each of the at least one dimension is associated with at least one column of the table.

25. The program storage device of claim 22, wherein the at least one table definition parameter is associated with a Create Table or an Alter Table statement.

26. The program storage device of claim 22, wherein the table is a multidimensional table.

27. The program storage device of claim 26, wherein the multidimensional table is used to store application information.

28. The program storage device of claim 27, wherein the application information is for a data warehouse.

29. The program storage device of claim 26, further comprising the step of creating a composite dimension index for the multidimensional table.

30. The program storage device of claim 29, wherein the step of creating a composite dimension index is automatically performed.

31. The program storage device of claim 29, wherein the composite dimension index comprises a list of composite keys, each composite key being associated with a cell of the multidimensional table and having a list of at least one block identifier for the cell.

32. The program storage device of claim 22, further including the step of processing a query for information stored in the table.

33. The program storage device of claim 32, wherein the step of processing the query comprises:

using information from one of the at least one block index and the composite dimension index to obtain a list of block identifiers; and scanning at least one block for records that satisfy at least one criterion using the list of block identifiers to locate the at least one block to be scanned.

34. The program storage device of claim 32, wherein the step of processing the query comprises at least one of:

scanning the entire table for records that satisfy at least one criterion; and using a record-based index to find records that satisfy at least one criterion.

35. The program storage device of claim 32, wherein the step of processing the query comprises index ANDing.

36. The program storage device of claim 32, wherein the step of processing the query comprises index ORing.

37. The program storage device of claim 32, wherein the step of processing the query comprises developing a query plan based on a cost model and processing the query according to the query plan.

38. The program storage device of claim 22, further comprising the step of processing a maintenance request.

39. The program storage device of claim 38, wherein the maintenance request comprises a request for one of a load, a reorganization, an insert, a delete, a purge, and an update.

40. The program storage device of claim 39, wherein the step of processing a maintenance request for a load or an insert comprises one of:

using one of the at least one block if there is free space; and allocating a new block to the table if there is no free space.

41. The program storage device of claim 38, wherein clustering of the table is maintained after the maintenance request is processed.

42. The program storage device of claim 38, wherein the step of processing a maintenance request for a reorganization, a delete, or a purge comprises the step of reclaiming space.

* * * * *